(12) United States Patent
Yamashita et al.

(10) Patent No.: US 10,723,290 B2
(45) Date of Patent: Jul. 28, 2020

(54) CIRCUIT BODY-ROUTING STRUCTURE

(71) Applicants: YAZAKI CORPORATION, Tokyo (JP); TOYOTA JIDOSHA KABUSHIKI KAISHA, Aichi-ken (JP)

(72) Inventors: Toshiaki Yamashita, Shizuoka (JP); Noriaki Sasaki, Shizuoka (JP); Shinji Oshita, Aichi-ken (JP); Hiroki Kawakami, Aichi-ken (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/211,158

(22) Filed: Dec. 5, 2018

(65) Prior Publication Data

US 2019/0176725 A1  Jun. 13, 2019

(30) Foreign Application Priority Data

Dec. 11, 2017 (JP) .................. 2017-237019

(51) Int. Cl.
*B60R 16/02* (2006.01)
*H02G 3/04* (2006.01)
*H01B 7/00* (2006.01)
*B62D 25/02* (2006.01)

(52) U.S. Cl.
CPC ....... *B60R 16/0215* (2013.01); *H02G 3/0406* (2013.01); *H02G 3/0437* (2013.01); *B62D 25/025* (2013.01); *H01B 7/0045* (2013.01)

(58) Field of Classification Search
CPC ... B60R 16/0215; B60R 16/02; B62D 25/025; B62D 25/2036; B62D 25/2045; B62D 25/20; H01B 7/0045; H02G 3/0406; H02G 3/0437; H02G 3/04
USPC ................................. 174/70 C; 296/193.07
See application file for complete search history.

(56) References Cited

U.S. PATENT DOCUMENTS

| 5,876,326 A | * | 3/1999 | Takamura | .......... A61B 1/00124 600/110 |
| 6,421,495 B1 | * | 7/2002 | Hoffmeister | .......... G02B 6/3885 385/139 |
| 10,532,708 B2 | * | 1/2020 | Yamashita | .......... H02G 3/0487 |
| 2007/0063116 A1 | * | 3/2007 | Sugimoto | .......... B60R 13/02 248/231.81 |

(Continued)

FOREIGN PATENT DOCUMENTS

| JP | 62-137746 U | 8/1987 | |
| JP | S62137746 U | * 8/1987 | ............. B60R 16/02 |

(Continued)

*Primary Examiner* — Timothy J Thompson
*Assistant Examiner* — Guillermo J Egoavil
(74) *Attorney, Agent, or Firm* — Kenealy Vaidya LLP

(57) ABSTRACT

There is provided a routing structure of a circuit body in a rocker formed on a vehicle body. The circuit body routing structure has a recessed housing groove formed along an extending direction of the rocker on a side surface of the rocker at a vehicle interior side, a circuit body that is formed of a long flat conductor having a conductor portion of a flat cross-sectional shape and that is housed in the housing groove and routed on the rocker, and an interior material that is mounted on the rocker so as to cover an upper surface and the side surface of the rocker, and that holds the circuit body in the housing groove.

5 Claims, 10 Drawing Sheets

(56) References Cited

U.S. PATENT DOCUMENTS

| | | | |
|---|---|---|---|
| 2007/0066125 A1* | 3/2007 | Uenver | H01R 13/595 439/459 |
| 2014/0327271 A1* | 11/2014 | Kishima | B62D 25/2036 296/193.07 |
| 2015/0301290 A1* | 10/2015 | Fujiwara | G02B 6/3885 385/83 |
| 2016/0149329 A1 | 5/2016 | Nakata | |
| 2019/0176723 A1* | 6/2019 | Yamashita | B62D 25/04 |

FOREIGN PATENT DOCUMENTS

| | | | |
|---|---|---|---|
| JP | 1-126854 U | 8/1989 | |
| JP | 2-127175 A | 5/1990 | |
| JP | H02127175 A * | 5/1990 | B62D 25/20 |
| JP | 8-256416 A | 10/1996 | |
| JP | 9-245529 A | 9/1997 | |
| JP | 2007-307921 A | 11/2007 | |
| JP | 2016-101046 A | 5/2016 | |
| JP | 2016-165166 A | 9/2016 | |

\* cited by examiner

CIRCUIT BODY-ROUTING STRUCTURE

CROSS-REFERENCE TO RELATED APPLICATIONS

This application is based on and claims priority under 35 USC 119 from Japanese Patent Application No. 2017-237019 filed on Dec. 11, 2017, the contents of which are incorporated herein by reference.

TECHNICAL FIELD

The present invention relates to a circuit body routing structure.

BACKGROUND ART

In a vehicle such as an automobile, a wire harness may be routed in a front-rear direction along a lateral portion of a vehicle body. As a technique for routing a wire harness along a lateral portion of a vehicle body, there is known a technique in which, on a side portion of a vehicle body, a wire harness including an electric wire to which a protection member is attached is disposed on an inner corner portion formed on an upper portion of a rocker (a side sill) including a side panel raised up from a floor and a panel extending horizontally from an upper edge of the side panel (for example, see Patent Document 1).

There is also known a technique in which a wire harness fixed to a protector is housed in a groove formed on a side surface of a rocker, and the protector is fastened and fixed to a stud bolt provided on the rocker (for example, see Patent Document 2).

PRIOR ART DOCUMENT

Patent Document

Patent Document 1: JP-A-2016-165166
Patent Document 2: JP-U-H1-126854

SUMMARY OF INVENTION

However, when the wire harness bundling the electric wire is routed along the upper portion of the rocker as described in Patent Document 1, a height of the entire rocker is increased, and excellent boarding/alighting performance thereof is impaired. In addition, since a pillar partitioning a door opening on the front and the rear of the vehicle is joined to the upper portion of the rocker, the wire harness needs to be routed around the pillar, and the wire harness protrudes toward the floor side in the pillar portion. Further, the portion of the wire harness protruding toward the floor side needs to be protected by mounting the protector, resulting in an increase in weight and cost of the wire harness.

Further, in the routing structure as described in Patent Document 2, although upward bulkiness of the rocker is suppressed, fixing work for fixing the protector to a predetermined position of the wire harness with a tape or the like and fastening work for fitting the wire harness to the groove of the rocker so as to fasten the protector to the stud bolt provided on the rocker are required, and thus it takes time and effort to perform routing on the vehicle body. Further, since a fastening structure such as a stud bolt and a nut for fastening the protector is required, the cost is increased.

The present invention has been made in view of the circumstances described above, and it is an object of the present invention to provide a circuit body routing structure which can easily be routed along a rocker while ensuring excellent boarding/alighting performance, and which can lower the cost.

In order to achieve the above-described object, the circuit body routing structure according to the present invention is characterized by the following (1) to (3).

(1) A circuit body routing structure in a rocker formed on a vehicle body, comprising:
a recessed housing groove formed along an extending direction of the rocker on a side surface of the rocker at a vehicle interior side,
a circuit body that is formed of a long flat conductor having a conductor portion of a flat cross-sectional shape and that is housed in the housing groove and routed on the rocker, and
an interior material that is mounted on the rocker so as to cover an upper surface and the side surface of the rocker, and that holds the circuit body in the housing groove.

(2) The circuit body routing structure according to (1), wherein:
a part of the circuit body protrudes from the housing groove and is in contact with the interior material.

(3) The circuit body routing structure according to (1), wherein:
a pressing member having elasticity is provided between the interior material and the circuit body, and the circuit body is pressed toward a bottom wall of the housing groove by the pressing member.

(4) The circuit body routing structure according to (1), further comprising an adhesive member that adheres the bottom wall of the housing groove and the circuit body.

According to the circuit body routing structure of the above configuration (1), the circuit body formed of the flat conductor is housed in the housing groove on the side surface of the rocker, and is held by the interior material covering the upper surface and the side surface of the rocker. As a result, it is possible to prevent upward bulkiness and projection toward the vehicle interior side of the rocker, thereby ensuring excellent boarding-alighting performance. Further, since the circuit body is held by the interior material, compared with a structure in which the circuit body is partially held by a fixing member such as a metal fitting or a protector, the entire circuit body housed in the housing groove can be held by the interior material, and a fixing member can be eliminated, thereby reducing the weight and the cost can be reduced. Further, since the circuit body is housed in the recessed housing groove and the interior material is mounted on the rocker, the circuit body can be routed very easily on the rocker of the vehicle body, thereby improving the routing workability.

According to the circuit body routing structure of the above configuration (2), since the circuit body partially protruding from the housing groove is in contact with the interior material, the circuit body is pressed into the housing groove by the interior material. As a result, the circuit body can be held more favorably, and it is possible to suppress the influence of vibration on the circuit body and generation of abnormal noise during travelling of the vehicle or the like.

According to the circuit body routing structure of the above configuration (3), the circuit body is pressed toward the bottom wall of the housing groove by the pressing member, so that the circuit body can be held more favorably, and it is possible to suppress the influence of vibration on the circuit body and generation of abnormal noise during travelling of the vehicle or the like.

According to the circuit body routing structure of the above configuration (4), the circuit body is adhered to the bottom wall of the housing groove by the adhesive member. As a result, the circuit body can be held more favorably, and it is possible to suppress the influence of vibration on the circuit body and generation of abnormal noise during travelling of the vehicle or the like.

According to the present invention, it is possible to provide a circuit body routing structure which can easily be routed along a rocker while ensuring excellent boarding/alighting performance, and which can lower the cost.

The present invention has been briefly described above. Further, the details of the present invention will be further clarified by reading embodiments for applying the invention as described below (hereinafter referred to as "embodiments") with reference to the accompanying drawings.

DESCRIPTION OF EMBODIMENTS

Embodiments of the present invention will be described below with reference to the drawings.

Figure 1:
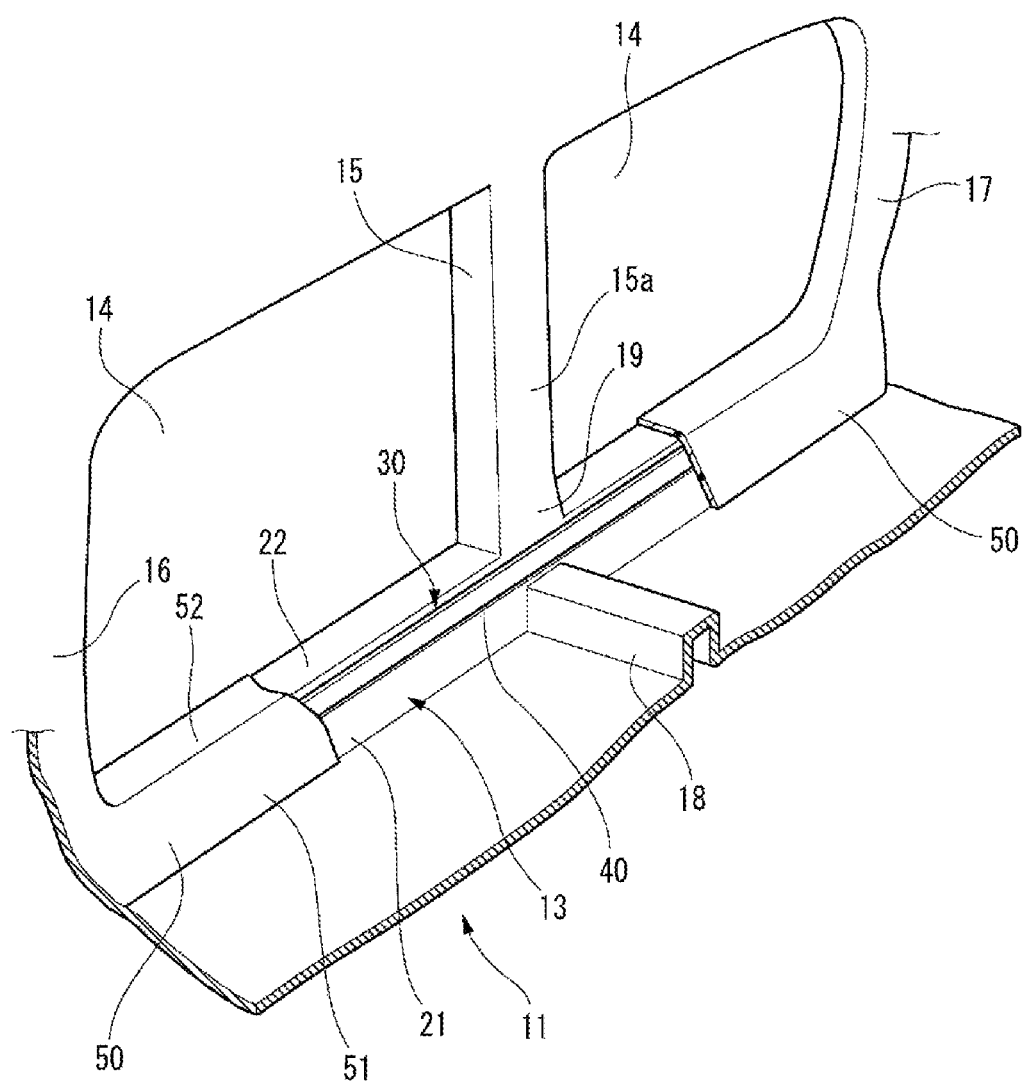
FIG. 1 is a perspective view of a vehicle body illustrating a circuit body routing structure according to the present embodiment.

FIG. 1 is a perspective view of a vehicle body illustrating a circuit body routing structure according to the present embodiment.

As shown in FIG. 1, the vehicle body 11 includes a rocker (side sill) 13 on a side portion of a floor panel 12. The rocker 13 extends in a vehicle front-rear direction and constitutes a lower edge of door openings 14 on the front and the rear of the vehicle. The rocker 13 projects upward from the floor panel 12. The rocker 13 has a side surface 21 and an upper surface 22.

A center pillar 15 partitioning the door openings 14 on the front and the rear of the vehicle is erected on the vehicle body 11 at an intermediate position in the vehicle front-rear direction. A lower end of the center pillar 15 is joined to the rocker 13. Lower ends of a front pillar 16 and a rear pillar 17 are joined to a front end and a rear end of the rocker 13, respectively. A cross member 18 extending in a vehicle width direction is formed in the floor panel 12, and an end portion of the cross member 18 is joined to the rocker 13.

A vehicle circuit body (hereinafter, simply referred to as a circuit body) 30 is routed along the rocker 13 on the vehicle body 11. An interior material 50 is attached to the rocker 13 on which the circuit body 30 is routed. The interior material 50 is molded from a resin such as plastic, and has a side plate portion 51 and an upper plate portion 52. The side surface 21 and the upper surface 22 of the rocker 13 on which the circuit body 30 is routed are covered by the side plate portion 51 and the upper plate portion 52 of the interior material 50. The interior material 50 attached to the rocker 13 is also attached to a junction 19 between the rocker 13 and the center pillar 15.

Figure 2:
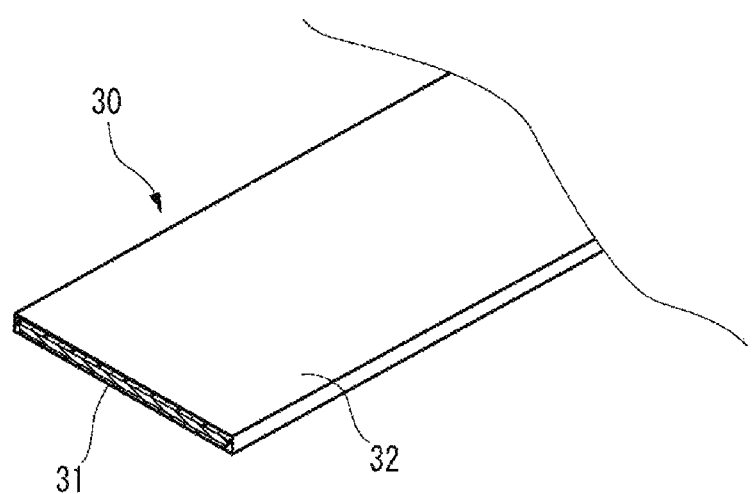
FIG. 2 is a perspective view of a vehicle circuit body formed of a flat conductor.

FIG. 2 is a perspective view of a vehicle circuit body formed of a flat conductor.

As shown in FIG. 2, the circuit body 30 is a long flat conductor having a conductor portion 31 formed in a flat cross-sectional shape, and is linearly formed. The conductor portion 31 is made of aluminum or an aluminum alloy, and the circuit body 30 is formed by covering the surrounding of the conductor portion 31 with an insulating layer 32 made of resin. The circuit body 30 is used as, for example, a power line (12V line). According to the circuit body 30 having the conductor portion 31 made of aluminum or an aluminum alloy, weight reduction can be achieved. The circuit body 30 may include a conductor portion 31 made of copper or a copper alloy.

Figure 3:
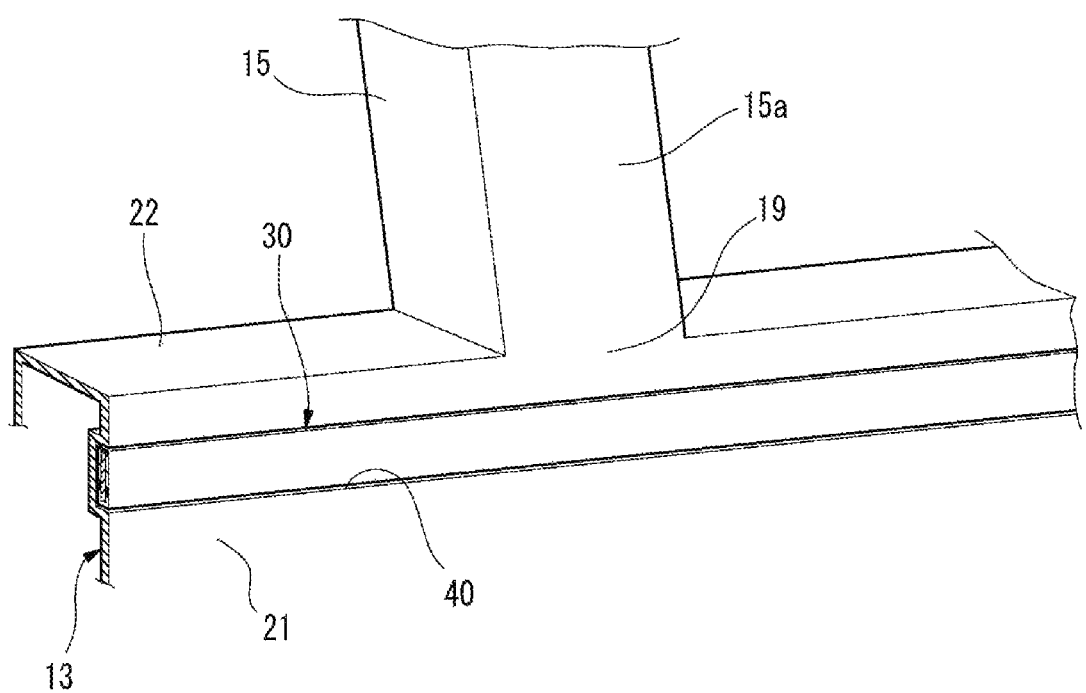
FIG. 3 is a perspective view of a rocker on which the vehicle circuit body is routed.
Figure 4:
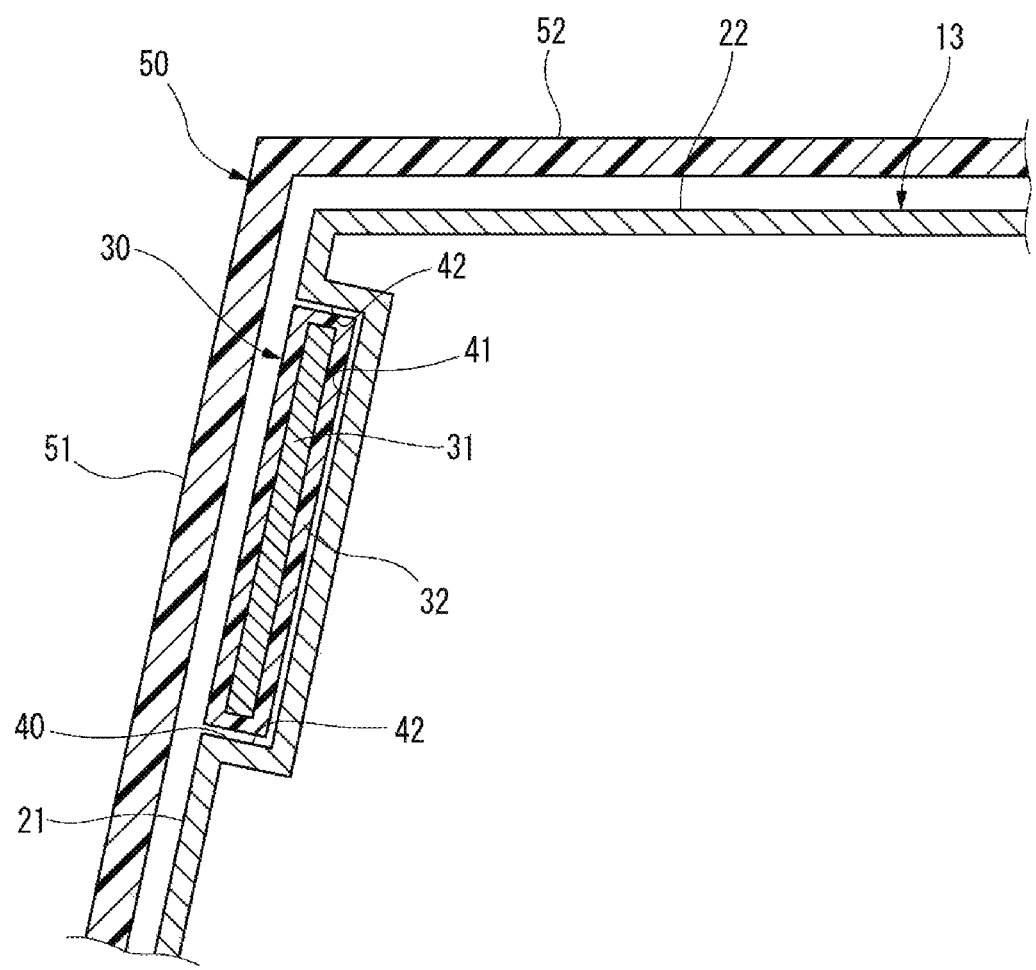
FIG. 4 is a cross-sectional view of the rocker on which the vehicle circuit body is routed.

FIG. 3 is a perspective view of the rocker on which the vehicle circuit body is routed. FIG. 4 is a cross-sectional view of the rocker on which the vehicle circuit body is routed.

As shown in FIGS. 3 and 4, the rocker 13 has a housing groove 40. The housing groove 40 is formed on the side surface 21 on the vehicle interior side of the rocker 13. The housing groove 40 is formed linearly along the extending direction of the rocker 13. The housing groove 40 is formed in a recess shape having a bottom wall 41 and side walls 42 forming both sides of the bottom wall 41. The housing groove 40 has a slightly larger width dimension than the circuit body 30. The housing groove 40 has substantially the same depth dimension as the thickness of the circuit body 30. The circuit body 30 is housed in the housing groove 40. The interior material 50 is attached to the rocker 13 in which the circuit body 30 is housed in the housing groove 40. The upper surface 22 of the rocker 13 is covered by the upper plate portion 52 of the interior material 50, and the side surface 21 is covered by the side plate portion 51 of the interior material 50. Thus, the circuit body 30 housed in the housing groove 40 is held in a state in which detachment thereof from the housing groove 40 is suppressed by the side plate portion 51 of the interior material 50. In this way, in the rocker 13 in which the circuit body 30 is housed in the housing groove 40 of the side surface 21, the upper plate portion 52 of the interior material 50 is disposed above the upper surface 22 without a member disposed therebetween.

Figure 5:
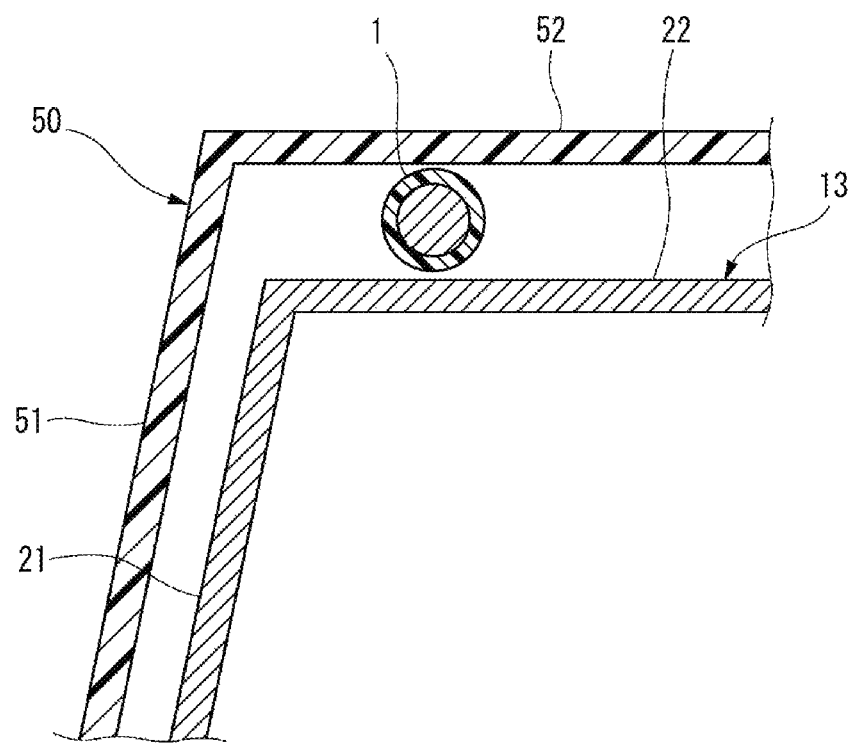
FIG. 5 is a cross-sectional view of the rocker on which a wire harness such as a wire bundle or a round bar conductor is routed.
Figure 6:
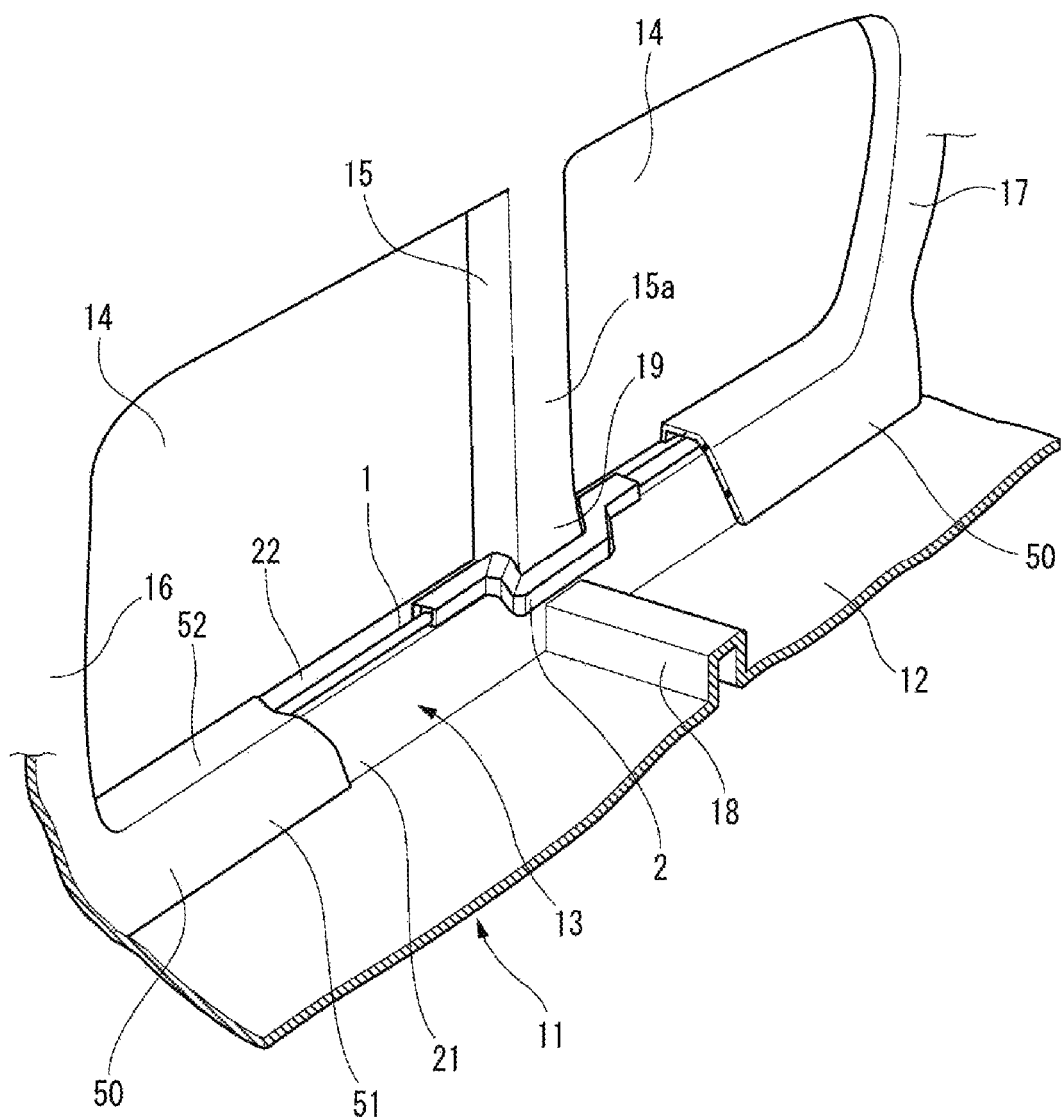
FIG. 6 is a perspective view of a vehicle body in which a wire harness such as a wire bundle or a round bar conductor is routed on a rocker.

FIG. 5 is a cross-sectional view of a rocker on which a wire harness such as a wire bundle or a round bar conductor is routed. FIG. 6 is a perspective view of a vehicle body in which a wire harness such as a wire bundle or a round bar conductor is routed on a rocker.

As shown in FIG. 5, in the structure in which the circuit body 1 is routed on the upper surface 22 of the rocker 13, particularly when the circuit body 1 is a wire bundle, a round bar conductor, and the like, the height of the upper plate portion 52 of the interior member 50 assembled to the rocker 13 is increased, and boarding/alighting performance is impaired.

Figure 7:
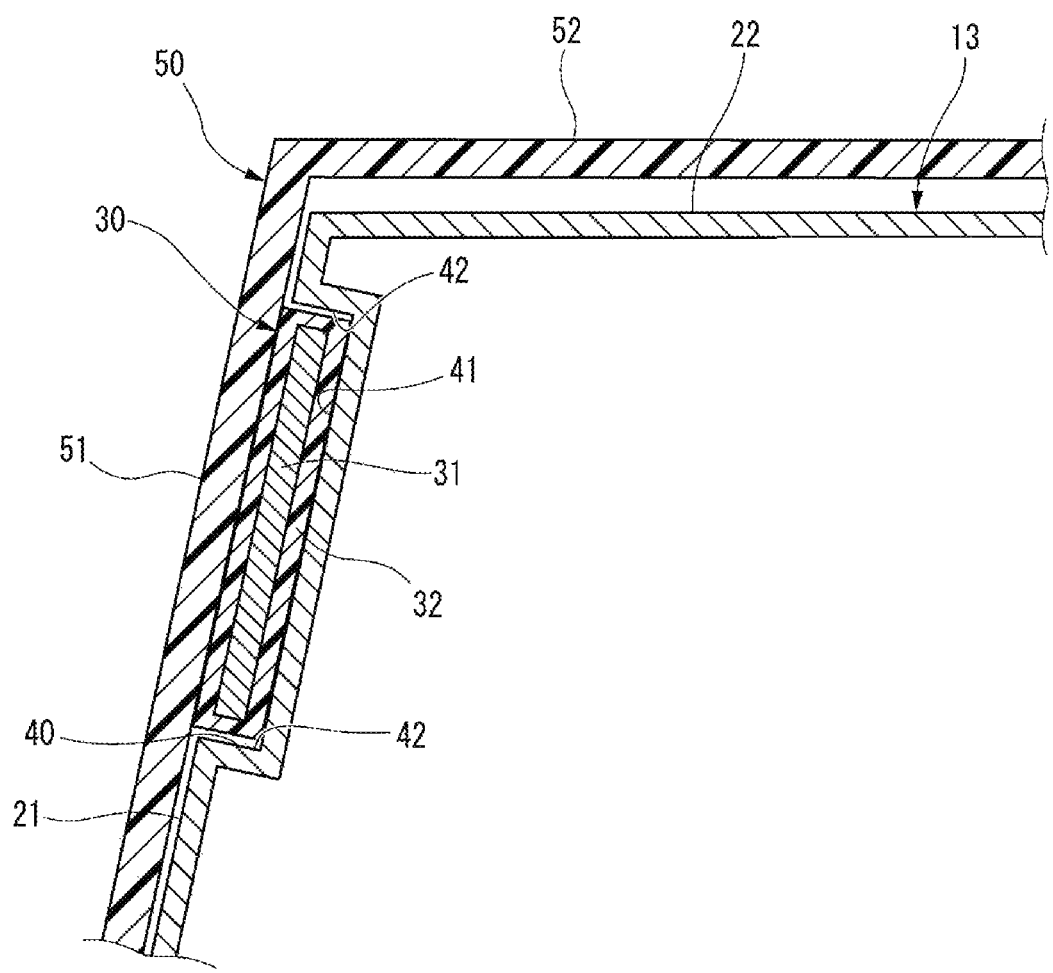
FIG. 7 is a cross-sectional view of a rocker illustrating a circuit body routing structure according to a first modification.

As shown in FIG. 7, a portion of the center pillar 15 of the circuit body 1 routed on the upper surface 22 of the rocker 13 that is detoured through the side surface 15a on the vehicle interior side projects toward the vehicle interior side. Moreover, it is necessary to attach the protector 2 to the projecting portion so as to protect the same.

In contrast, according to the circuit body routing structure according to the first embodiment, the circuit body 30 formed of a flat conductor is housed in the housing groove 40 of the side surface 21 of the rocker 13, and is held by the interior member 50 covering the upper surface 22 and the side surface 21 of the rocker 13. As a result, it is possible to prevent upward bulkiness and projection to the vehicle interior side of the rocker 13, thereby ensuring excellent boarding/alighting performance (see FIG. 4). Further, since the circuit body 30 is held by the interior material 50, compared with a structure in which the circuit body 30 is partially held by a fixing member such as a metal fitting or a protector, the entire circuit body 30 housed in the housing groove 40 can be held by the interior material 50, and a fixing member can be eliminated, thereby reducing the weight and the cost can be reduced. Further, since the circuit body 30 is housed in the recessed housing groove 40 and the interior material 50 is mounted on the rocker 13, the circuit body 30 can be routed very easily on the rocker 13 of the vehicle body 11, thereby improving the routing workability.

Next, various modifications of the circuit body routing structure according to the above embodiment will be described.

First Modification

FIG. 7 is a sectional view of a rocker illustrating a circuit body routing structure according to a first modification.

As shown in FIG. 7, in the circuit body routing structure according to the first modification, the depth dimension of the housing groove 40 is smaller than the thickness of the circuit body 30. Accordingly, a part of the circuit body 30 protrudes from the housing groove 40. In the first modification, an inner surface of the side plate portion 51 of the interior member 50 is in contact with the circuit body 30 housed in the housing groove 40.

According to the circuit body routing structure of the first modification, since the circuit body 30 partially protruding from the housing groove 40 is in contact with the side plate portion 51 of the interior member 50, the circuit body 30 is pressed into the housing groove 40 by the side plate portion 51 of the interior member 50. Thus, the circuit body 30 can be held more favorably, and it is possible to suppress the influence of vibration on the circuit body 30 and generation of abnormal noise during travelling of the vehicle or the like.

Second Modification

Figure 8:
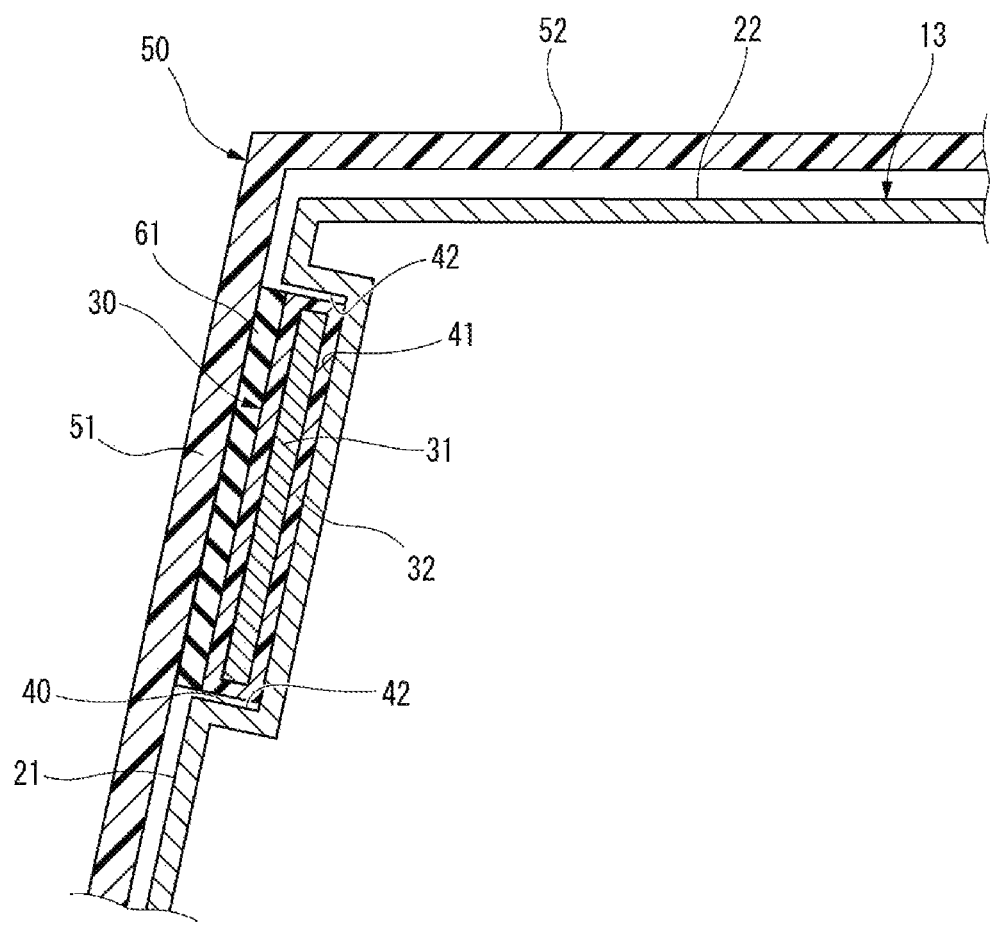
FIG. 8 is a cross-sectional view of a rocker illustrating a circuit body routing structure according to a second modification.

FIG. 8 is a sectional view of a rocker illustrating a circuit body routing structure according to a second modification.

As shown in FIG. 8, in the circuit body routing structure according to the second modification, a plate-shaped pressing member 61 having elasticity is provided on the interior member 50. The pressing member 61 is formed of, for example, an elastic material such as rubber, and is fixed to the inner surface of the side plate portion 51 of the interior member 50, that it's a surface on the side of the circuit body 30 housed in the housing groove 40. The pressing member 61 is disposed between the side plate portion 51 of the interior member 50 and the circuit body 30 housed in the housing groove 40 and is in contact with the circuit body 30, by assembling the interior member 50 to the rocker 13. In the second modification, the circuit body 30 housed in the housing groove 40 is pressed toward the bottom wall 41 of the housing groove 40 by the pressing member 61.

According to the circuit body routing structure according to the second modification, the circuit body 30 is pressed toward the bottom wall 41 of the housing groove 40 by the pressing member 61, so that the circuit body 30 can be held more favorably, and it is possible to suppress the influence of vibration on the circuit body 30 and generation of abnormal noise during travelling of the vehicle or the like.

The pressing member 61 may be partially provided in the longitudinal direction of the circuit body 30, but by being provided over the entire length of the circuit body 30 in the longitudinal direction, the circuit body 30 can be stably held by being pressed toward the bottom wall 41 of the housing groove 40 spanning the entire length. The pressing member 61 may be provided on a surface of the circuit body 30 on the side of the side plate portion 51 of the interior member 50.

Third Modification

Figure 9:
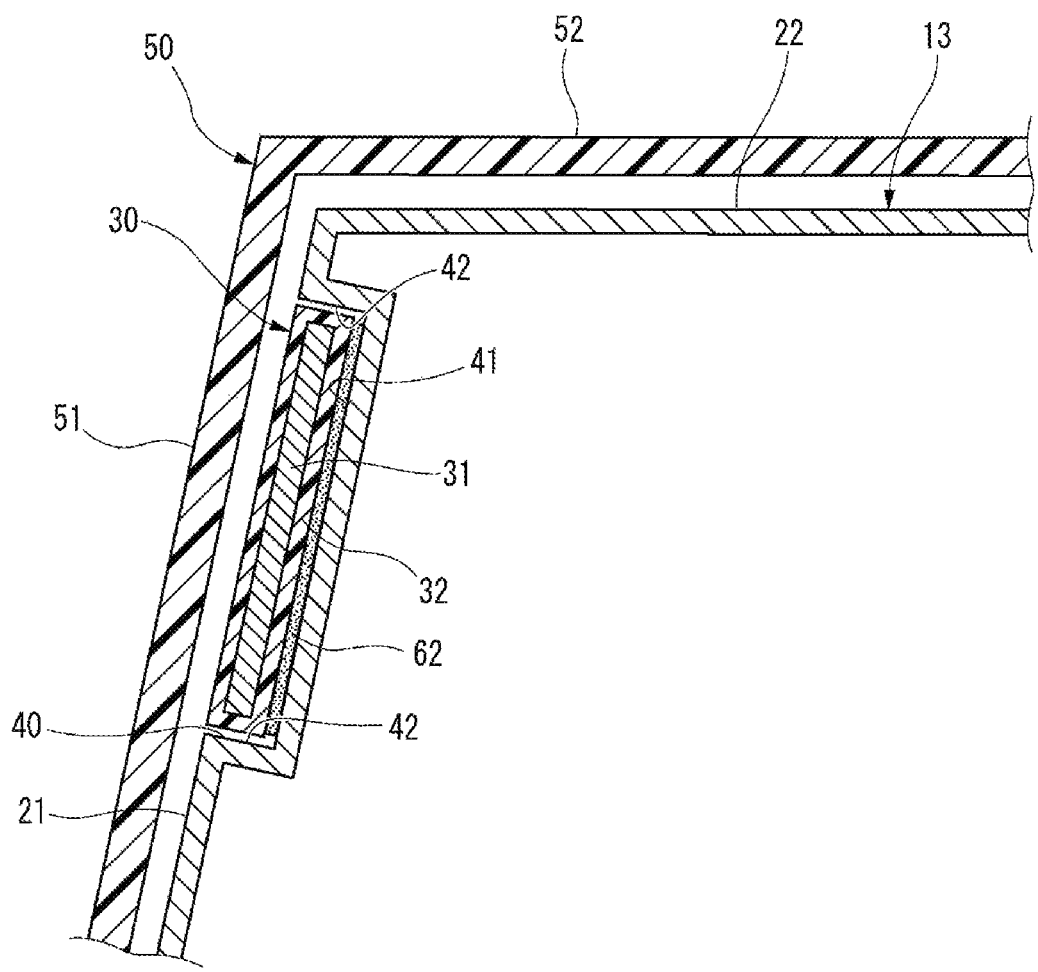
FIG. 9 is a cross-sectional view of a rocker illustrating a circuit body routing structure according to a third modification.

FIG. 9 is a sectional view of a rocker illustrating a circuit body routing structure according to a third modification.

As shown in FIG. 9, in the circuit body routing structure according to the third modification, the bottom wall 41 of the housing groove 40 and the circuit body 30 are adhered by an adhesive member 62. As the adhesive member 62, for example, a double-sided adhesive tape and the like can be used.

According to the circuit body routing structure of the third modification, the circuit body 30 is adhered to the bottom wall 41 of the housing groove 40 by the adhesive member 62. Thus, the circuit body 30 can be held more favorably, and it is possible to suppress the influence of vibration on the circuit body 30 and generation of abnormal noise during travelling of the vehicle or the like.

The circuit body 30 may be partially adhered to the bottom wall 41 by the adhesive member 62 in the longitudinal direction, but by adhering the circuit body 30 to the bottom wall 41 by the adhesive member 62 spanning the entire length in the longitudinal direction of the circuit body 30, the circuit body 30 can be stably held in the housing groove 40 spanning the entire length.

The present invention is not limited to the above-described embodiments, and various modifications and improvements can be made. In addition, the material, shape, size, number, arrangement position, and the like of each component in the above-described embodiment are arbitrary without being limited as long as the present invention can be achieved.

Figure 10:
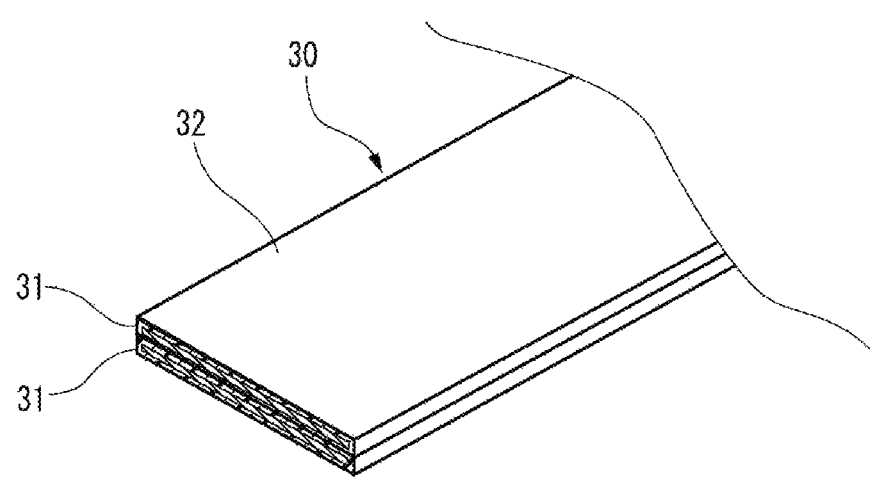
FIG. 10 is a perspective view of a vehicle circuit body including a flat conductor in which two conductor portions are laminated.

For example, in the above embodiment, the case where the conductor portion 31 has one circuit body 30 housed in the housing groove 40 and routed on the rocker 13 is exemplified, but as shown in FIG. 10, the circuit body 30 may be formed by laminating a plurality of conductor portions 31 covered with the insulating layer 32. For example, when two conductor portions 31 are laminated as the circuit body 30, one conductor portion 31 may be used as a power line, and the other conductor portion 31 can be used as a ground line (GND line).

Here, the features of the circuit body routing structure according to the present invention described above are briefly summarized in [1] to [4], respectively.

[1] A routing structure of a circuit body (30) in a rocker (13) formed on a vehicle body (11), comprising:
a recessed housing groove (40) formed along an extending direction of the rocker (13) on a side surface (21) of the rocker (13) at a vehicle interior side,
a circuit body (30) that is formed of a long flat conductor having a conductor portion (31) of a flat cross-sectional shape and that is housed in the housing groove (40) and routed on the rocker (13), and
an interior material (50) that is mounted on the rocker (13) so as to cover an upper surface (22) and the side surface (21) of the rocker (13), and that holds the circuit body (30) in the housing groove (40).

[2] The circuit body routing structure according to [1], wherein:
a part of the circuit body (30) protrudes from the housing groove (40) and is in contact with the interior material (50).

[3] The circuit body routing structure according to [1], wherein:
a pressing member (61) having elasticity is provided between the interior material (50) and the circuit body (30), and the circuit body (30) is pressed toward a bottom wall (41) of the housing groove (40) by the pressing member (61).

[4] The circuit body routing structure according to [1], further comprising an adhesive member (62) that adheres the bottom wall (41) of the housing groove (40) and the circuit body.

REFERENCE SIGNS LIST 11 vehicle body
13 rocker
21 side surface
22 upper surface
30 vehicle circuit body
31 conductor portion
40 housing groove
41 bottom wall
50 interior material
61 pressing member
62 adhesive member

What is claimed is:

1. A circuit body routing structure in a rocker formed on a vehicle body comprising:
a recessed housing groove formed along an extending direction of the rocker on a side surface of the rocker at a vehicle interior side;
a circuit body that is formed of a long flat conductor having a conductor portion of a flat cross-sectional shape and that is housed in the housing groove and routed on the rocker; and
an interior material that is mounted on the rocker so as to cover an upper surface and the side surface of the rocker, and that holds the circuit body in the housing groove,
wherein a part of the circuit body protrudes from the housing groove and is in contact with the interior material, and
wherein a pressing member having elasticity is provided between the interior material and the circuit body, and the circuit body is pressed toward a bottom wall of the housing groove by the pressing member.

2. The circuit body routing structure according to claim 1, further comprising an adhesive member that adheres the bottom wall of the housing groove and the circuit body.

3. The circuit body routing structure according to claim 1, wherein:
the recessed housing groove is formed integrally with the rocker.

4. The circuit body routing structure according to claim 1, wherein:
the recessed housing groove is formed continuous with the rocker.

5. The circuit body routing structure of claim 1 wherein a depth dimension of the housing groove is smaller than a depth dimension of the circuit body.

* * * * *